United States Patent Office.

JOHN OTTO DONNER, OF JERSEY CITY, NEW JERSEY.

Letters Patent No. 98,155, dated December 21, 1869.

IMPROVED PROCESS OF TREATING WINES, BEER, AND LIQUORS.

The Schedule referred to in these Letters Patent and making part of the same.

*To all whom it may concern:*

Be it known that I, JOHN OTTO DONNER, of Jersey City, in the county of Hudson, and State of New Jersey, have invented a new and useful Improvement in the Treatment of Wines, Beers, and Liquors; and I do hereby declare that the following is a full, clear, and exact description of the same.

My improvement relates to the neutralization of the free acid formed in wines, more particularly those of the lighter kind, beers, ales, and other beverages, when allowed to stand for the purposes of cooling, fermentation, clarification, or otherwise.

Such acetic, lactic, and other acids, when in excess, impart a sourness to the beverage that not unfrequently involves heavy loss to the producer, vender, or consumer, by making it fit only to be converted into vinegar, or else have necessitated the use of neutralizing agents, which impair its taste and flavor by reason of such, as heretofore used, being soluble salts or compounds, as, for instance, soda, lime, or bicarbonate of soda, the latter being employed for foaming beverages, or in which an evolution of carbonic acid gas is required.

All such soluble compounds, therefore, are objectionable, as, remaining in solution, they correct the acidity of the beverage at the expense of its flavor, and sometimes its wholesomeness.

My invention removes these objections, by employing, for the neutralization of the free acid in the beverage, salts of magnesia, which, being of an insoluble character, are precipitated, and thus allow of the clear liquid being drawn off without being impaired.

For wines or liquids of a still character, I prefer to use these salts in the form of a hydrate of magnesia, but for foaming beverages employ carbonate of magnesia.

The treatment may be carried on either in the cask, cooling, or any other vessel, and the proportion of such neutralizing salts varies from half to two per cent., by weight, or thereabout, of the beverage or liquid being treated, according to the acidity to be neutralized.

To arrive at a correct proportion for said salts in any particular case, it is only necessary to draw off a small measure or quanty of the beverage and mix with it the hydrate or carbonate of magnesia, commencing with half per cent., by weight, and, if necessary, continuing to add such salts up to two per cent., or thereabout, should the application of the usual litmus-paper or acid-test, which should be made after each addition of the salts, show a superabundance of acidity to remain in the beverage. More than two per cent., by weight, of such salts would seldom or never be requisite, although no positive injury would arise from exceeding such quantity, should the liquid be sufficiently valuable to warrant the expense.

After the proper proportion of the salts for the beverage under treatment has been thus ascertained in the small measure, such salts are then mixed in like proportions with the bulk or mass of beverage in the cask or vessel, and after remaining a day or two, more or less, the liquid standing above the settled precipitate formed by the insoluble salts may be drawn off clear and free from objectionable acidity, without detriment, by the neutralizing agent employed, to its taste, flavor, or wholesomeness.

What is here claimed, and desired to be secured by Letters Patent, is—

The treatment of wines, beers, or liquors with salts of magnesia, substantially as and for the purpose herein set forth.

J. O. DONNER.

Witnesses:
FRED. HAYNES,
R. E. RABEAU.